United States Patent Office 2,730,497
Patented Jan. 10, 1956

2,730,497

ROTARY WELL DRILLING AND COMPOSITION THEREFOR

Tzeng Jiueq Suen, New Canaan, and Arthur M. Schiller, Stamford, Conn., assignors to American Cyanamid Company, New York, N. Y., a corporation of Maine No Drawing. Application January 23, 1953,
Serial No. 333,008

8 Claims. (Cl. 252—8.5)

This invention relates to the drilling of deep wells, such as oil and gas wells, by the rotary drilling process and more particularly to an improved drilling fluid for use therein. The invention includes the improved drilling fluids themselves, their methods of preparation, and rotary drilling processes employing them.

In the drilling of oil wells and other deep wells by rotary drilling processes it is now the practice to recirculate an aqueous fluid called "drilling mud" down through the hollow drill pipe, across the face of the drill bit and upwardly through the drill hole. The drilling mud serves to cool and lubricate the drill bit, to raise the drill cuttings to the surface of the ground and to seal the sides of the well to prevent loss of water and drilling fluids into the formation through which the drill hole is being bored. After each passage through the well the mud is pumped into a settling tank or trough, wherein the sand and drill cuttings are separated with or without screening, after which the fluid is again pumped into the drill pipe by a mud pump.

The aqueous drilling fluids employed in such rotary drilling processes are usually composed of an inorganic solid suspending agent such as clays of various types, an aqueous dispersing medium which may be water or aqueous solutions of inorganic salts such as sodium chloride, and special materials usually termed "additives" to obtain desired special characteristics in the mud. Thus, for example, barytes, iron oxides and other finely divided weighting materials are sometimes added to increase the specific gravity of the mud, thereby preventing blowouts when gas pockets are encountered. Inorganic polyphosphates such as sodium tetraphosphate and sodium hexametaphosphate are frequently added for viscosity control. Water loss-controlling materials to prevent seepage of the aqueous dispersing medium into the surrounding formation are usually added, and it is to this class of drilling mud additives that our present invention is particularly directed.

We have discovered a class of water-soluble methylol melamine derivatives, hereinafter described as melamine-aldehyde resins, which impart improved water loss characteristics to aqueous drilling fluids. We have found that the addition of even relatively small quantities of these melamine-aldehyde resins to aqueous drilling muds will reduce substantially the loss of water into the surrounding formation by increasing the water-impermeability of the mud wall or sheath lining the drilling hole.

The melamine-aldehyde resins used in practicing our invention are the condensation products of three classes of components; namely melamine, a reactive aldehyde such as formaldehyde, paraformaldehyde, acetaldehyde and the like, and a sulfonating agent such as a water-soluble sulfite or bisulfite. We have found that by combining these reagents in the manner hereinafter described a hydrophilic sulfonated melamine-aldehyde resin is obtained that is both non-thermosetting and permanently hydrophilic; i. e., the resin does not convert into a water-insoluble solid or even become hydrophobic upon continued heating, but remains a hydrophilic colloid for the life of the drilling mud. In this condition it functions as a binder for the clay particles in the mud sheath surrounding the well and assists in forming a relatively thin but impermeable barrier against loss of water from the drilling fluid.

The reaction between the three classes of ingredients listed above may be carried out with any desired order of addition. Thus, for example, melamine and formaldehyde may be reacted under neutral or mildly acid or alkaline conditions to form an unpolymerized or only slightly polymerized reactive methylol melamine with which a water-soluble sulfite or bisulfite may be reacted to introduce sulfonate groups into the product. Alternatively, the sulfite or bisulfite may first be reacted with the aldehyde; for example a bisulfite formaldehyde may be used. Finally, all three classes of reactants may be mixed together and reacted simultaneously in a single step process. Obviously variations in or combinations of these procedures may be used; thus, a part of the formaldehyde or other aldehyde may be condensed with melamine and another with an alkali metal or ammonium salt of sulfurous acid and the resulting initial condensation products may be brought together and combined into the final hydrophilic sulfonated melamine-formaldehyde resin.

The methylol melamines containing from about 1.75–2 up to about 6 mols of formaldehyde for each mol of melamine form stable water-soluble syrups and may be used, but we prefer those containing from about 2 to about 4 mols of formaldehyde for each mol of melamine. Any water-soluble salt of sulfurous acid may be employed including particularly the alkali metal and ammonium sulfites, bisulfites and metabisulfites. Formaldehyde and formaldehyde-yielding substances such as paraformaldehyde, hexamethylenetetramine and the like constitute the most important class of aldehydes, although for special purposes higher aliphatic aldehydes such as acetaldehyde and the like could be used. When formaldehyde or formaldehyde-yielding substances are used we find that the desired permanently hydrophilic melamine-formaldehyde resins are obtained by employing from about 0.75 to about 2 mols of sulfite-yielding material for each mol of melamine. For example, we may add 0.75–2 mols and preferably about 0.9–1.5 mols of an alkali metal or ammonium sulfite or bisulfite whereas a correspondingly smaller molar proportion of sodium metabisulfite ($Na_2S_2O_5$) or other alkali metal or ammonium metabisulfite could be used to obtain the same degree of sulfonation.

Using the above reagents in the amounts specified we carry out the preparation of the permanently hydrophilic melamine-formaldehyde resins in two stages. After initially combining the melamine and formaldehyde under neutral or mildly acid or alkaline conditions, if desired, we effect the sulfonation reaction with the sulfurous acid salt under alkaline conditions and at pH values of about 8–11 or higher. This produces a clear syrup of an only slightly polymerized sulfonated methylol melamine. We then reduce the pH of the syrup to a value between about 1.5 and about 3.7, preferably by adding a mineral acid such as hydrochloric acid or sulfuric acid, and maintain it at polymerizing temperatures within the range of about 40° C. to 55° C. until the desired viscosity is obtained. Inasmuch as the water loss-controlling properties of the resin are materially improved by a relatively high degree of polymerization, indicated by an increased viscosity of the syrup, this polymerization step is quite important. We find that the optimum degree of polymerization of the resin for use in drilling fluids corresponds to a minimum viscosity at 25° C. of 50 centipoises at 20% solids concentration; from this minimum value the polymerization may be allowed to increase until a soft or incipient gel is formed.

In order to facilitate control of the reaction it is preferable to bring the initial sulfonated resin syrup to a concentration of between about 15% and 25% solids prior to the polymerizing step, either by dilution of more concentrated syrups with water or by carrying out the first stage of the process at these concentrations. After the degree polymerization has been completed to the desired degree it is halted by raising the pH of the syrup to a value higher than about 4.5, and preferably to one where the syrup is neutral or slightly alkaline. At pH values of 7.0 and higher the polymerized resin syrups are fluid in character and are stable during storage, shipment and use.

The quantities of our hydrophilic sulfonated resin aldehyde syrups to be employed in drilling may be varied throughout a wide range, depending upon particular muds used and the conditions encountered during the drilling operation. Based on the solids content of the neutralized resin syrup, quantities of as little as 0.5 pound per 42 gallon barrel of mud may be used with oil emulsion muds having 5% or more of a hydrocarbon oil emulsified therein. From this minimum, the amounts can be increased to as much as 8–10 lbs. per barrel of mud in ordinary usage. Under special circumstances, of course, larger amounts up to as much as 3–5% on the weight of the mud may be used; however, such large quantities are rarely needed. Ordinarily the proper quantities of a water loss-controlling reagent are determined during the course of a drilling operation by a mud engineer by considering the start being drilled, the likelihood of seepage of water into the surrounding formation and the possible presence of heaving shale and other adverse conditions, and it is understood that this procedure will be followed in applying our present invention.

In many drilling operations it is now the practice to use oil emulsion muds which contain about 5–50% of crude oil or other hydrocarbon oil emulsified in the clay-water suspension. Our new resins can be employed to good advantage in such muds. Ordinarily these muds also contain an emulsifying agent such as tall oil soap, fatty acid ethanolamide-ethylene oxide condensation products and the like, and the hydrophilic sulfonated melamine-aldehyde resins which we employ are compatible with these and similar emulsifying agents. It will be understood, therefore, that the term "drilling fluid" as used in the appended claims includes emulsion drilling muds as well as the holder type wherein no hydrocarbon oil was employed.

The invention will be further illustrated by the following specific examples. It will be understood however that although these examples may describe some of the specific details of our invention they are given primarily for purposes of illustration, the scope of the invention being defined by the appended claims.

In all of the examples the water loss tests were made on a standard 100-pound wall-building tester, which consists of a three-inch closed pressure filter connected with a compressed nitrogen tank and provided with a graduate for measuring the volume of filtrate. The water loss values were obtained with 100 pounds pressure on the filter and an average filtration temperature of 25° C.

*Example 1*

Fourteen hundred and sixty (1460) parts of 37% formalin was adjusted to pH=4.5 and charged to a suitable reaction flask. Seven hundred fifty-six (756) parts of melamine was added and the slurry pH was about 7. The reaction mixture was heated at 80° C. until a clear solution was formed. The reaction mixture was cooled to 45° C. Five hundred seventy (570) parts of sodium metabisulfite was added, followed by eight hundred thirty (830) parts of water. The pH was adjusted with sodium hydroxide solution to 10.5. The reaction mixture was heated at 80°–85° C. for about 90 minutes and then cooled to 50°–55° C. The reaction mixture was then diluted to 20% calculated solids. The pH of the solution was adjusted to 3.34 with hydrochloric acid and the temperature was raised to 50–55° C. After about 4 hours at 50°–55° C. and 18 hours at room temperature, the solution had formed a soft and incipient gel. The pH was adjusted to 7.9 by the addition of dilute sodium hydroxide and the product reverted to a viscous solution having a viscosity of 125 centipoises when measured as a 20% solution at 25° C.

The syrup was used to treat a Ventura oil well drilling mud having a specific gravity of 1.3 and containing 30% solids. Three (3) pounds of solid per barrel was used. The water loss after 30 minutes was 13.4 ml. The mud viscosity was not affected by the addition of the compound. A control test without the addition of the resinous product gave a water loss figure of 70 ml.

*Example 2*

Seventeen hundred (1700) parts of 37% formalin was adjusted to a pH of 4.45 and charged into a reaction vessel. Eight hundred and eighty-two (82) parts of melamine was added and the reaction mixture heated at 80° C. until a clear solution was formed. The reaction was then cooled to about 45° C. Six hundred and sixty-five (665) parts of sodium metabisulfite and nine hundred and eighty (980) parts of water were added and the pH was adjusted to 10.5 with 20% sodium hydroxide solution. The reaction mixture was heated at 80°–85° C. until the free bisulfite was less than 0.2% by an iodine titration. The batch was then cooled to 50°–55° C. and diluted with six thousand three hundred and fifty (6350) parts of water containing one hundred and fourteen (114) milliliters of concentrated sulfuric acid. The pH of the batch was 3.6. The batch was then heated at 50°–55° C. until the viscosity at 50° C. was 280 centipoises as measured by a Brookfield Synchro-Electric Viscosimeter. The reaction mixture was neutralized with 40% sodium hydroxide to a pH of 11. The viscosity of the neutralized resin dropped to 125 centipoises at 25° C. at 20% solids.

When used in a Ventura oil well drilling mud at 3 pounds per barrel, the 30 minute water loss was 11.3 ml. The viscosity of the mud slurry was not increased by the addition of the compound.

*Example 3*

Four hundred and fifty-four (454) parts of 37% formalin was charged into a suitable reaction vessel. The pH was adjusted to 4.2. Two hundred and fifty-two (252) parts of melamine were added and the batch heated to 80°–85° C. After the melamine dissolved, the batch was cooled to 45°–50° C. One hundred and ninety (190) parts of sodium metabisulfite and three hundred and twenty-four (324) parts of water wer added. The pH was adjusted to 10.5 with dilute sodium hydroxide and the temperature increased to 80°–85° C. The reaction was maintained at 80°–85° C. until the unreacted bisulfite content was less than 0.2%. The temperature was then dropped to 50°–55° C. and the batch diluted with eighteen hundred and thirty-six (1836) parts of water to which thirty-three (33) milliliters of concentrated sulfuric acid had been added. The pH was 3.85. It was readjusted to 3.6 by the addition of dilute sulfuric acid. The batch was maintained at 50°–55° C. until the viscosity of the syrup was 1770 centipoises at 50° C. as measured on a Brookfield Synchro-Electric Viscosimeter. It was then neutralized to a pH of 10.4 with 40% sodium hydroxide. The final viscosity of the syrup was 200 centipoises at 25° C. at 20% solids.

A mud was prepared by suspending in water sufficient "P-95 Rotary Clay" to obtain a specific gravity of 1.38. A sample of this mud gave a 30 minute water loss of 14 cc.

An emulsion mud was prepared by adding 1 pound per barrel of sulfonated tall oil and 40% by volume of crude mineral oil and agitating until a smooth emulsion was obtained. A quantity equivalent to 1 pound per barrel of the hydrophilic sulfonated melamine resin syrup was then added and incorporated uniformly, after which the 30 minute water loss was 8 cc.

Example 4

A bentonitic clay sold commercially as "Magcogel" was hydrated with fresh water over night and made into a mud containing 20 pounds of clay per barrel. To this there was added 2 pounds per barrel of sodium hydroxide and 2 pounds per barrel of quebracho as an aqueous solution of the mixture. There was then added a quantity of diesel oil equivalent to 0.2 pound per barrel of the finished emulsion mud wherein one-half pound per barrel of an emulsifier had been dissolved. The emulsifier was the condensation product of 50 mols of ethylene oxide with one mol of a tail oil monoethanolamide.

A sample of the mud was taken and a quantity of the hydrophilic resin syrup of Example 2 was added equivalent to 3 pounds per barrel. A 30 minute water loss test was run and viscosity determinations before and after adding the resin were made in a Fann V. G. meter. The treated mud showed a water loss of 8 cc. and a viscosity of 73 centipoises. The control (untreated mud) had a viscosity of 50 centipoises and a water loss of about 12 cc.

Reference is made to our application Serial No. 333,007, filed concurrently herewith, which claims the preparation of our new resins.

What we claim is:

1. A drilling fluid for drilling deep wells by the rotary drilling process comprising an inorganic solid suspending agent, an aqueous dispersing medium, and a quantity of a permanently hydrophilic sulfonated melamine-aldehyde resin sufficient to reduce water loss into the surrounding formation without increasing the viscosity of the drilling fluid to such an extent that it cannot be circulated.

2. A composition according to claim 1 wherein the resin is a sulfonated melamine-formaldehyde resin.

3. A drilling fluid for drilling deep wells by the rotary drilling process comprising an inorganic solid suspending agent, an aqueous dispersing medium, and a permanently hydrophilic melamine-aldehyde resin sulfonated by a content of from about 0.75 to 2 combined sulfonate groups for each mol of melamine, said resin being present in an amount sufficient to reduce water loss into the surrounding formation without increasing the viscosity of the drilling fluid to such an extent that it cannot be circulated.

4. A composition according to claim 3 wherein the resin is a sulfonated melamine-formaldehyde resin.

5. A drilling fluid for drilling deep wells by the rotary drilling process comprising an inorganic solid suspending agent, an aqueous dispersing medium, and a permanently hydrophilic sulfonated melamine-formaldehyde resin having a minimum degree of polymerization corresponding to a voscosity of 50 centipoises when measured at 25° C. in an aqueous syrup at 20% solids, said resin being present in an amount sufficient to reduce water loss into the surrounding formation without increasing the voscosity of the drilling fluid to such an extent that it cannot be circulated.

6. A drilling fluid for drilling deep wells by the rotary drilling process comprising an inorganic solid suspending agent, an aqueous dispersing medium, and a permanently hydrophilic melamine-formaldehyde resin sulfonated by a content of about 0.75 to 2 combined sulfonate groups for each mol of melamine and polymerized by heating at a pH within the range of about 1.5 to 3.7 to a minimum viscosity of 50 centipoises when measured at 25° C. in an aqueous syrup at 20% solids, said resin being present in an amount sufficient to reduce water loss into the surrounding formation without increasing the viscosity of the drilling fluid to such an extent that it cannot be circulated.

7. A drilling fluid for drilling deep wells by the rotary drilling process comprising an emulsion of oil in a clay-water mixture, said emulsion containing a quantity of a permanently hydrophilic sulfonated melamine-formaldehyde resin sufficient to reduce water loss into the surrounding formation without increasing the viscosity of the drilling fluid to such an extent that it cannot be circulated.

8. A drilling fluid according to claim 7 wherein the melamine-formaldehyde resin is sulfonated by a content of about 0.75 to 2 combined sulfonate groups for each mol of melamine and polymerized by heating at a pH within the range of about 1.5 to 3.7 to a minimum viscosity of 50 centipoises when measured at 25° C. in an aqueous syrup at 20% solids.

References Cited in the file of this patent

UNITED STATES PATENTS

| | | |
|---|---|---|
| 2,331,281 | Wayne | Oct. 12, 1943 |
| 2,407,599 | Auten et al. | Sept. 10, 1946 |
| 2,612,485 | Baer et al. | Sept. 30, 1952 |
| 2,639,274 | Salathiel | May 19, 1953 |